Dec. 29, 1959 C. H. VLACHOS 2,918,982
AUTOMOTIVE VEHICLE POWER PLANT, CHASSIS AND RUNNING GEAR
Filed Aug. 22, 1956 3 Sheets-Sheet 1

INVENTOR
Constantinos H. Vlachos,
BY
Herbert J. Jacobi
ATTORNEY

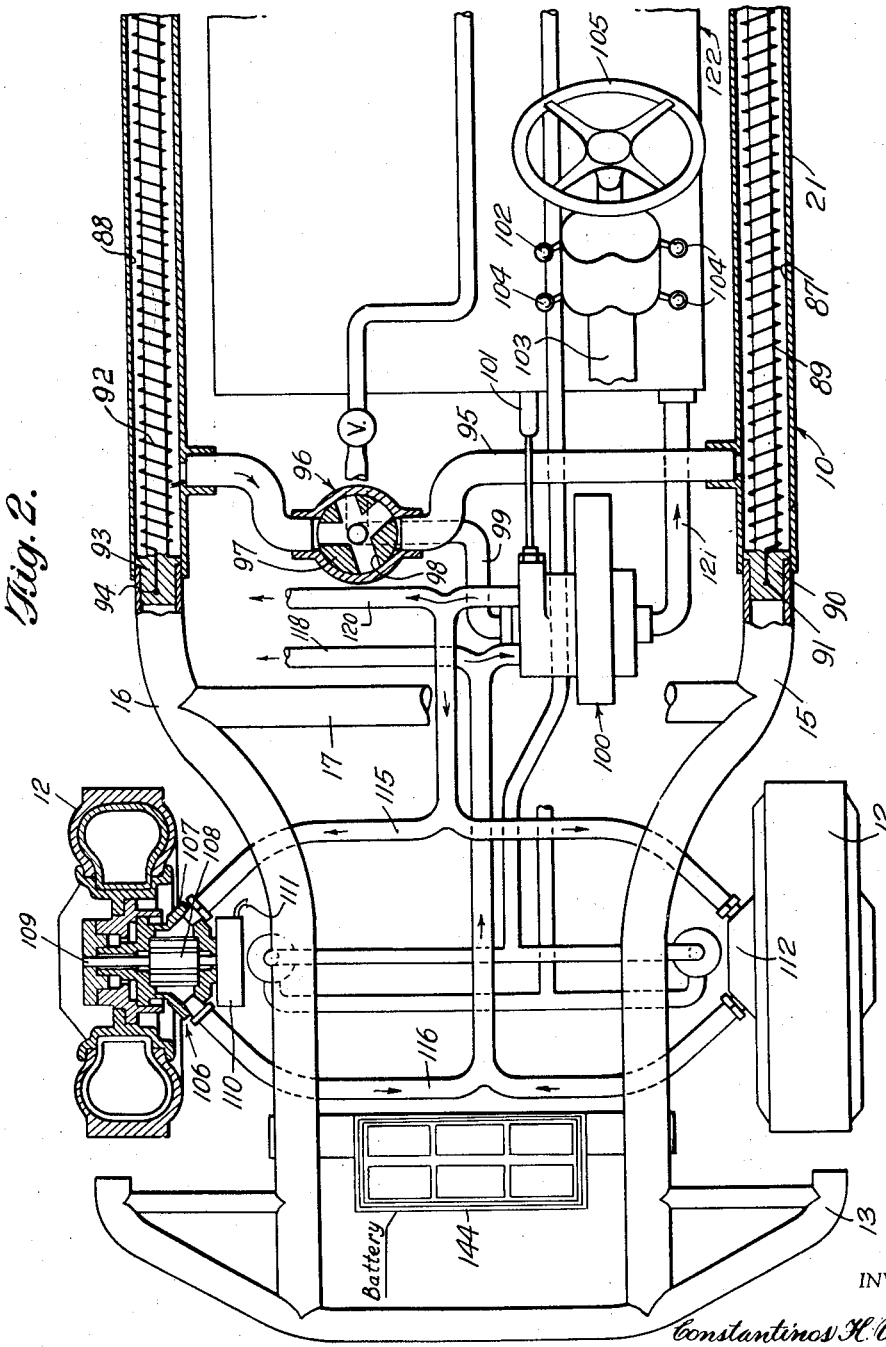

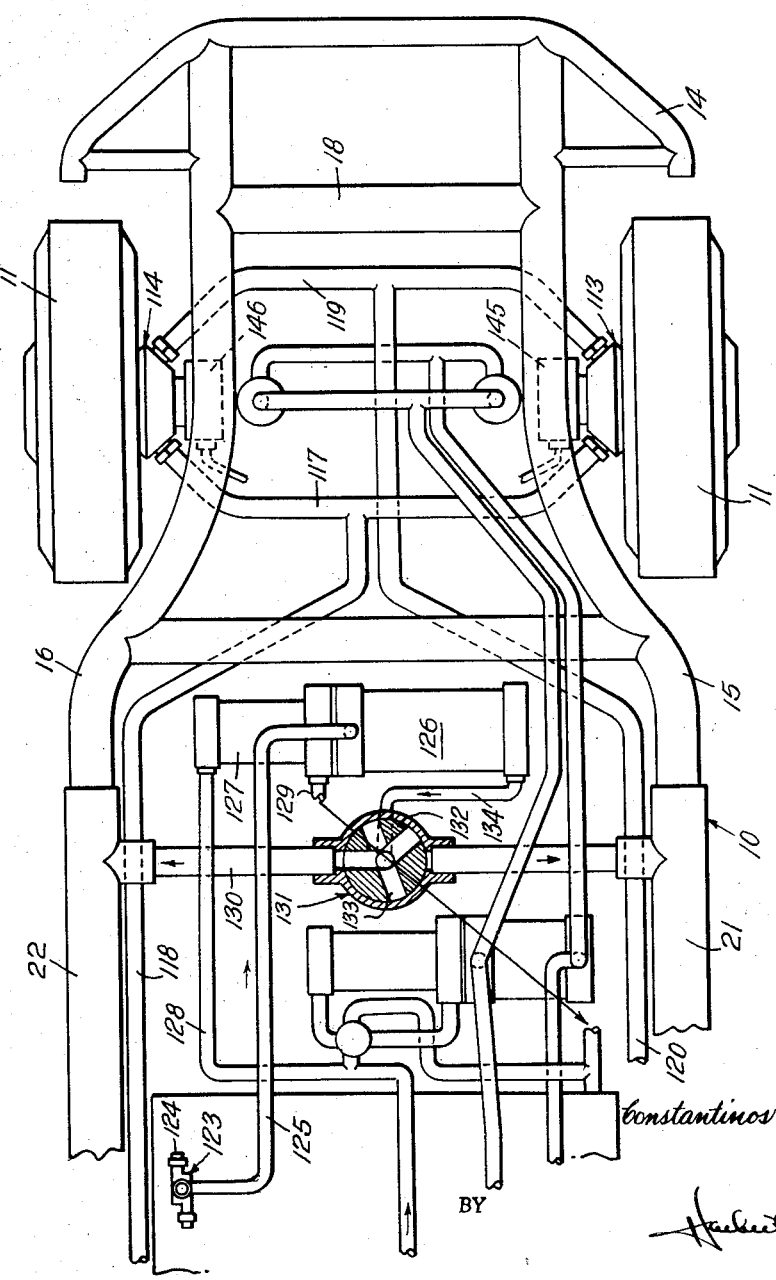

United States Patent Office 2,918,982
Patented Dec. 29, 1959

2,918,982

AUTOMOTIVE VEHICLE POWER PLANT, CHASSIS AND RUNNING GEAR

Constantinos H. Vlachos, Washington, D.C.

Application August 22, 1956, Serial No. 605,632

18 Claims. (Cl. 180—67)

This invention relates to transportation and more particularly to a power plant primarily designed to be incorporated in and drive an automotive vehicle and also to a chassis for such vehicle.

Many different types of automotive vehicles have been proposed and utilized over the years and these have ranged from the early steam-powered vehicles to the present-day highly developed automotive vehicle, the great majority of which utilize a hydro-carbon fuel, such as, gasoline or fuel oil in an internal combustion engine. While the early vehicles, both of the steam-powered type and the internal combustion engine driven type, were relatively heavy in comparison to the horse-power supplied by the power plant, the present day automotive vehicle has reached a high degree of perfection and the weight/horse power ratio is very favorable. However, under certain conditions it may be desirable to provide an automotive vehicle incorporating a power plant which does not utilize a hydrocarbon fuel, such as, gasoline or fuel oil, and also one which is relatively light and small.

In further consideration of the rough and difficult terrain over which vehicles are required to operate, it is sometimes advantageous that driving power be applied to all of the ground engaging wheels of such vehicle and in the past, this has been provided with considerable success insofar as trucks or other heavy vehicles are concerned, but in the smaller vehicles, such as passenger or pleasure cars, the inclusion of four-wheel drive or drive to all of the ground engaging wheels has usually not been included because of the relatively high cost thereof. With a single prime mover, such as an internal combustion engine, which is utilized in substantially all present day automotive vehicles, it is necessary in order to provide driving power to all of the ground engaging wheels to include relatively complex and costly power transmission systems, including shafts, gearing, universal joints, and the like, and this relatively complex mechanism has materially increased the danger of failure due to wear or breakage and, therefore, in addition to the relatively high initial cost, the cost of maintenance is also relatively high.

Briefly stated, the present invention contemplates the provision of an automotive vehicle incorporating a power plant in which a comparatively volatile liquid is vaporized by the use of electrical energy to provide a gas at a relatively high pressure which gas is supplied to individual reversible motors mounted on each ground engaging wheel and in which the exhaust gas from such motors is returned to a condenser where the same is condensed and the liquid subsequently returned to the chambers within which the liquid is vaporized. A suitable gas driven pump for returning such liquid from the condenser to the chambers is supplied as well as suitable controls for controlling the direction of movement of the motors as well as the speed thereof. The invention further contemplates the provision of a chassis made up of tubular members and in which certain of such tubular members are utilized to provide gas pressure chambers in which the liquid is vaporized to provide the driving power for the motors.

It is accordingly an object of the invention to provide an automotive vehicle of improved and economical construction and incorporating a power plant which serves to deliver power to individual motors mounted on each ground engaging wheel.

A further object of the invention is the provision of an automotive vehicle incorporating a power plant utilizing a fluoro-carbon which is vaporized by electrical energy to provide a high-pressure gas for driving individual reversible gas motors mounted on each ground engaging wheel of the vehicle.

A still further object of the invention is the provision of an automotive vehicle incorporating a power plant utilizing a fluoro-carbon liquid which is vaporized to provide high pressure gas for driving gas motors and in which the exhaust from such motors is condensed and the liquid returned to the chambers in which the vaporization of the liquid takes place.

Another object of the invention is the provision of an automotive vehicle incorporating a power plant utilizing a fluoro-carbon liquid disposed in a pair of chambers and incorporating electrical heating means for vaporizing the liquid in each chamber and in which the resulting high pressure gas may be supplied from either or both chambers to gas motors for driving the vehicle and with the exhaust from such motors condensed and the liquid returned to either or both chambers.

A further object of the invention is the provision of an automotive vehicle incorporating a power plant utilizing a liquid which is vaporized to provide high pressure gas for driving individual gas motors located on the ground engaging wheels of the vehicle and in which the liquid is vaporized by electrical heating elements energized from a storage battery and in which electrical generator means is provided for partially restoring energy to such storage battery.

A still further object of the invention is the provision of an automotive vehicle incorporating a power plant including chambers in which a liquid is vaporized to provide a high pressure gas for driving gas motors directly connected to the ground engaging wheels of the vehicle and in which suitable control means is provided for controlling the direction of motion and the speed of operation of the motors.

Another object of the invention is the provision of an automotive vehicle incorporating a power plant utilizing a high pressure gas obtained from liquid in chambers and in which such gas serves to drive individual motors mounted on the ground engaging wheels of the vehicle and in which the chambers for vaporizing the liquid constitute a part of the chassis of the vehicle.

A further object of the invention is the provision of a vehicle incorporating a power plant utilizing a liquid which is vaporized to provide high pressure gas such gas in turn serving to drive a motor forming a prime mover for the vehicle.

A still further object of the invention is the provision of a power plant incorporating chambers in which a liquid is vaporized to provide a high pressure gas and in which one or more gas motors are driven by such high pressure gas to provide a prime mover and with the exhaust from such motor or motors condensed and the liquid returned to the chambers for subsequent vaporization.

Further objects and advantages of the invention will be apparent from the following description taken in conjunction with the accompanying drawings wherein:

Figure 2 is a diagrammatic plan view to an enlarged scale of the front portion of the vehicle shown in Figure 1; and Figure 3 is a diagrammatic plan view to an enlarged scale and showing the rear portion of the vehicle shown in Figure 1.

Figure 1:
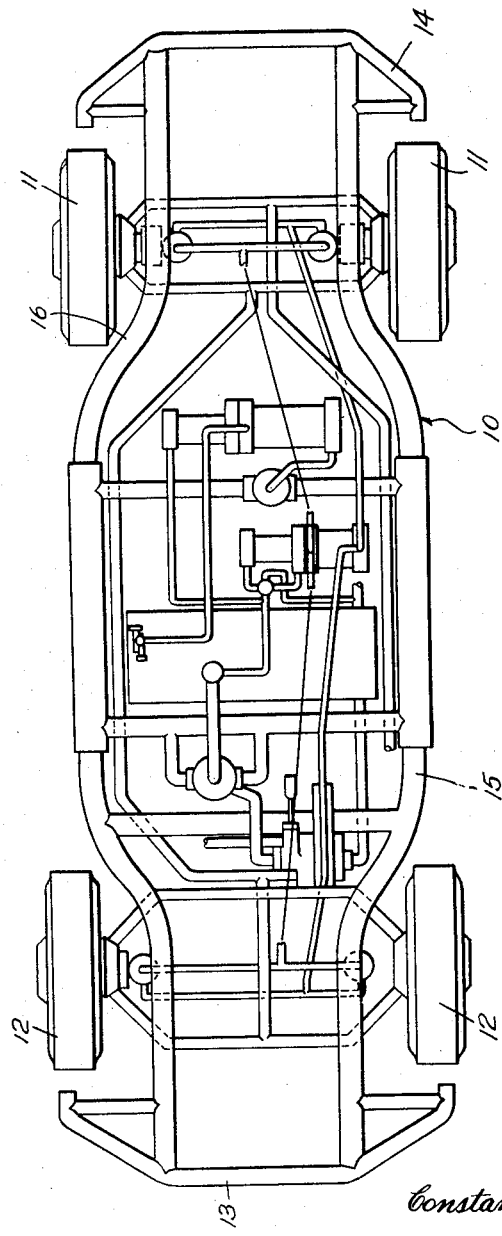
Figure 1 is a diagrammatic plan view of an automotive vehicle constructed in accordance with the invention and showing the structure of the chassis as well as the structure and manner of installation of the power plant.

With continued reference to the drawings, there is shown an automotive vehicle constructed in accordance with this invention and which may well include a chassis 10 having rear ground engaging wheels 11 and steerable front ground engaging wheels 12. The chassis 10 may be provided with a front bumper 13 and with a rear bumper 14.

As shown the chassis may well comprise elongated tubular side members 15 and 16 which are disposed in spaced parallel relationship and these side members may be connected by a plurality of tubular cross members 17 adjacent the front end of the chassis 10 and by a plurality of tubular cross members 18 adjacent the rear end of the chassis 10. As shown the side members 15 and 16 are provided intermediate the length thereof with enlarged elongated tubular portions 21 and 22 which serve to provide chambers, the purpose of which will be later described.

As mentioned above, the tubular side members 15 and 16 of the chassis 10 include elongated tubular sections 21 and 22 of enlarged diameter and as best shown in Figure 2, these sections provide gas pressure generator chambers 87 and 88. These chambers 87 and 88 are partially filled with a liquid, the nature of which will be later described, and disposed within the chamber 87 is an electrical heating element 89, which may be supported at the closed end 90 of the chamber 87, as shown in Figure 2, and the opposite end of the heating element 89 may be supported in a similar manner. A suitable terminal 91 is provided for connecting a source of electrical energy to one end of the heating element 89 and, of course, a similar terminal will be provided at the opposite end of the heating element. In a similar manner, an electrical heating element 92 is provided in the chamber 88 and extends throughout the length thereof and the element may be supported at one closed end of the chamber 88, as at 93, and a suitable terminal 94 is provided for connecting a source of electrical energy to the heating element 92. A similar suitable terminal will likewise be provided at the opposite end of the heating element 92.

A gas supply manifold 95 connects the chambers 87 and 88 and disposed in the manifold 95 is a three-way gas supply valve 96. The three-way valve 96 is provided with a valve plug 97 having a passage 98 therein and a conduit 99 is connected to the valve 96 and may receive gas from either or both chambers 87 and 88 depending upon the setting of the valve plug 97. The conduit 99 is connected to a combined forward, reverse and throttle control valve 100 and such valve may be provided with an accelerator pedal 101 for controlling the speed of the vehicle and the valve 100 may be actuated for forward and reverse movements of the vehicle by a control lever 102 mounted on a steering column 103 in a position convenient to the operator of the vehicle. The steering column 103 may be provided with additional control levers 104 for operating the brakes or for performing other functions and there may also be provided a steering wheel 105 mounted on the upper end of the steering column 103.

A gas driven reversible motor 106 is provided for driving one of the front ground engaging wheels 12 and as shown in Figure 2, the casing 107 of the motor 106 is mounted upon the wheel suspension means and is stationary except for up and down movements and the rotor 108 of the motor 106 is provided with a shaft 109 which is secured to the hub of the wheel 12 and upon rotation of the rotor 108 serves to drive the wheel 12. Also mounted on the shaft 109 is an emergency brake 110 of any suitable type, but as shown, an electric brake is utilized which may be energized through an electric cable 111. The motor 106 is of the type described and claimed in my prior patent, No. 2,725,013, issued November 29, 1955, and reference is had to this patent for a full description of the construction and operation of the motor. Since such structure and operation forms no part of the instant invention, any further detailed description thereof is considered unnecessary, it being considered sufficient to state that the motor 106 will be described in accordance with the principles disclosed in the above mentioned patent and will be of such a size as to provide the necessary power for driving the ground engaging wheel. In a similar manner a drive motor 112 is provided for the other front ground engaging wheel 12 and motors 113 and 114 are provided for the rear ground engaging wheels 11.

The motors 106 and 112 are connected by a conduit 115 which in turn is connected to the control valve 100 and the motors 106 and 112 are likewise connected by a second conduit 116 which is also connected to the control valve 100. Conduit 115 may serve to supply gas to the motors 106 and 112 for operation of the same in a forward direction during which operation the conduit 116 would serve as an exhaust. For operation in the opposite direction, gas will be supplied to the motors 106 and 112 through the conduit 116 while the conduit 115 will serve as an exhaust.

In a similar manner, the motors 113 and 114 on the rear wheels 11 are connected by a conduit 117 which in turn is connected through a conduit 118 with the control valve 100 and the motors 113 and 114 are also connected by a conduit 119 which is connected through a conduit 120 with the control valve 100. By means of this arrangement, the motors 113 and 114 may be supplied with gas for operation of the same in a forward direction and during such operation, the conduits 119 and 120 will serve as an exhaust, while for operation in the opposite direction, gas will be supplied to the motors 113 and 114 through the conduits 119 and 120 and conduits 117 and 118 will serve as a path for the exhaust gas flowing from the motors 113 and 114. It will, therefore, be seen that upon appropriate operation of the control valve 100 that all of the motors 106, 112, 113 and 114 may be operated in either direction and that upon actuation of the accelerator pedal 101, the speed of the motors may be increased or decreased at the will of the operator. It is to be understood that for normal operation that the gas for operation of the motors will be supplied from either one of the chambers 87 or 88 but where an additional volume of gas is required, the three-way valve 96 may be adjusted to provide gas simultaneously from both chambers 87 and 88.

As will be seen from the above, the exhaust gas from all of the motors is returned to the control valve 100 and leading from such control valve is a single exhaust conduit 121 which is connected to a condenser 122. Condenser 122 may be of any desired type and will be cooled by air-flow in order to condense the gas flowing thereto through the exhaust conduit 121. If desired, fans or other means may be employed to provide a sufficient air flow to the condenser 122 to condense the entire volume of gas flowing thereto through the conduit 121.

In order to provide protection against explosion or damage due to excess gas pressure a conventional pressure relief valve may be provided which will open at a predetermined pressure to by-pass gas from the conduit 99 to the condenser 122.

A liquid return fitting 123 may be provided on the condenser 122 and such fitting 123 may also be provided with a connection 124 for permitting convenient charging of the system with the liquid to be vaporized for producing the gas which is utilized to drive the motors mounted on the wheels. Also connected to the return fitting 123 is a liquid return conduit 125 which is connected to the intake of a liquid return pump 126. Pump 126 is driven by a gas motor 127 similar to the motors utilized on the wheels of the vehicle and motor 127 is provided with gas through a conduit 128 connected to the control valve 96 in the gas supply header 95. The exhaust from the motor 127 is conducted through a pipe 129 to the condenser 122.

A liquid return header 130 is connected between the chambers 87 and 88 at the end opposite to the manifold 95 and the header 130 is provided with a three-way control valve 131 provided with a valve plug 132 having a passage 133 therein. Connected to the valve 131 is a conduit 134 which in turn is connected to the discharge outlet of the liquid return pump 126. It will be seen that upon operation of the pump 126 that liquid will be withdrawn from the condenser 122 and returned to either or both of the chambers 87 and 88 through the conduit 134 and liquid return header 130 depending upon the setting of the three-way valve 131.

A storage battery 144 may be provided and serves as a source of electrical energy for the electrical heating elements 89 and 92 disposed in the chambers 87 and 88 and also electrical energy may be obtained from the battery 144 for operating the electric emergency brake 110 and for any other purpose desired, such as, lights, warning signals, and the like. If desired, a suitable control in the form of a rheostat or the like may be connected between the battery 144 and the heating elements 89 and 92 in order to control the operation thereof. In order to partially restore the electrical energy drained from the battery 144, there may be provided electrical generators 145 and 146 mounted on the rear wheel motor shaft and during coasting of the vehicle or running downhill, the generators 145 and 146 will serve to partially restore electrical energy to the battery 144. Obviously, the generators 145 and 146 cannot completely recharge the battery 144 since there are numerous losses present in the power plant and it will consequently be necessary to recharge the battery 144 from an external source at suitable intervals.

While other liquids may be employed in the chambers 87 and 88, it has been found that the most suitable liquid for use in a vehicle of this invention is a fluoro-carbon which has a boiling point of approximately 135° F. and it is proposed to utilize a gas pressure obtained by vaporizing such fluoro-carbon liquid in the chambers 87 and 88 of the order of 100 to 500 pounds per square inch, depending upon the power requirements of the vehicle. While, as stated, other liquids may be employed, it has been found that fluoro-carbon is the most satisfactory since such liquid is non-inflammable, non-toxic and is completely stable at the temperatures and pressures contemplated. The fluoro-carbon liquid is a conventional commercially available product. Since the power plant of this invention utilizes a completely closed system, once the same is charged with a suitable liquid, such as the fluoro-carbon mentioned above, no additional liquid will be necessary except to replace any which may be lost as a result of leakage or as a result of damage which may cause a loss of such liquid. Consequently, the only cost of operation insofar as the supply of power is concerned is the recharging of the battery 144.

In operating the vehicle of this invention, it is only necessary to energize one or both of the electrical heating elements 89 and 92 which will result in vaporizing the liquid within the chambers 87 and 88 and upon setting of the valve 96 gas under the desired pressure will be supplied from either or both of the chambers 87 and 88 to the control valve 100. Depending upon the setting of valve 100, the gas will be supplied through the conduits 115 and 117 to drive the vehicle in a forward direction or upon another setting of the valve 100, gas will be supplied to the motors through the conduits 116 and 119 to drive the vehicle in a reverse direction. Actuation of the accelerator pedal 101 would serve to control the speed of the vehicle in either direction. Regardless of the direction in which the vehicle is travelling, gas exhausted from the wheel driving motors will be conducted from the valve 100 through the conduit 121 to the condenser 122 within which the gas will be condensed and the liquid will be withdrawn from the condenser 122 by means of a liquid return pump 126 and depending upon the setting of the three-way valve 131 will be returned through the liquid return header 130 to either or both of the chambers 87 and 88. There is thereby provided a closed system in which liquid is vaporized, utilized for providing power and thereafter condensed and the liquid returned to the vaporizing chambers to be re-used.

It is also to be noted that while the power plant has been described in connection with an automotive vehicle, the same power plant or one similarly constructed could be utilized in other vehicles, such as, aircraft or boats, and also such a power plant could readily be utilized in a generating station as a prime mover or for any other desired stationary application.

By utilizing the principles and structures described above, a relatively small, light-weight and highly efficient automative vehicle may be provided and one in which operating cost and upkeep is maintained at a minimum. Furthermore, the various units utilized in the vehicle may be supplied as separate assemblies which may be conveniently assembled and installed to construct the entire vehicle.

It will be obvious to those skilled in the art that various changes may be made in the invention, without departing from the spirit and scope thereof, and, therefore, the invention is not to be limited by that which is shown in the drawings and described in the specification, but only as indicated in the appended claims.

What is claimed is:

1. In an automotive vehicle, a chassis comprising spaced side members and a plurality of cross members connecting said side members, said side members including elongated tubular sections closed at their opposite ends to provide a pair of gas pressure generator chambers, a liquid in each chamber, heating means for each chamber to vaporize said liquid, a gas supply manifold connecting said chambers, a three-way gas supply valve in said manifold, a liquid return header connecting said chambers, a three-way return valve in said header, ground engaging wheels rotatably mounted on said chassis, a reversible gas operated motor for independently driving each wheel, a combined forward, reverse and throttle control valve, a gas supply conduit from said supply valve to said control valve, gas supply and exhaust conduits from said control valve to each of said motors, whereby upon operation of said supply valve and said control valve said motors may be supplied with gas from either or both of said chambers, a condenser, a gas exhaust conduit from said control valve to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser to either or both of said chambers.

2. In an automotive vehicle, a chassis comprising spaced side members and a plurality of cross members connecting said side members, said side members including elongated tubular sections closed at their opposite ends to provide a pair of gas pressure generator chambers, a liquid in each chamber, heating means for each chamber to vaporize said liquid, a gas supply manifold connecting said chambers, a three-way gas supply valve in said manifold, a liquid return header connecting said chambers, a three-way return valve in said header, ground engaging wheels rotatably mounted on said chassis, a reversible gas operated motor for independently driving each wheel, control means for said motors, a gas supply conduit from said supply valve to said control means, gas supply and exhaust conduits from said control means to each of said motors, whereby upon operation of said supply valve and said control means said motors may be supplied with gas from either or both of said chambers, a condenser, a gas exhaust conduit from said control means to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser to either or both of said chambers.

3. In an automotive vehicle, a chassis comprising spaced side members and a plurality of cross members connecting said side members, said side members including elongated tubular sections closed at their opposite ends to provide a pair of gas pressure generator chambers, a liquid in each chamber, means to vaporize said liquid, a gas supply manifold connecting said chambers, a three-way gas supply valve in said manifold, a liquid return header connecting said chambers, a three-way return valve in said header, ground engaging wheels rotatably mounted on said chassis, a reversible gas operated motor for independently driving each wheel, control means for said motors, a gas supply conduit from said supply valve to said control means, gas supply and exhaust conduits from said control means to each of said motors, whereby upon operation of said supply valve and said control means said motors may be supplied with gas from either or both of said chambers, a condenser, a gas exhaust conduit from said control means to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser to either or both of said chambers.

4. In an automotive vehicle, a chassis comprising spaced side members and a plurality of cross members connecting said side members, said side members including elongated tubular sections closed at their opposite ends to provide a pair of gas pressure generator chambers, a liquid in each chamber, means to vaporize said liquid, a gas supply manifold connecting said chambers, a gas supply valve in said manifold, a liquid return header connecting said chambers, a return valve in said header, ground engaging wheels rotatably mounted on said chassis, a reversible gas operated motor for independently driving each wheel, control means for said motors, a gas supply conduit from said supply valve to said control means, gas supply and exhaust conduits from said control means to each of said motors, whereby upon operation of said supply valve and said control means said motors may be supplied with gas from either or both of said chambers, a condenser, a gas exhaust conduit from said control means to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser to either or both of said chambers.

5. In an automotive vehicle, a chassis comprising spaced side members and a plurality of cross members connecting said side members, said side members including elongated tubular sections closed at their opposite ends to provide a pair of gas pressure generator chambers, a liquid in each chamber, means to vaporize said liquid, a gas supply manifold connecting said chambers, a gas supply valve in said manifold, a liquid return header connecting said chambers, a return valve in said header, ground engaging wheels rotatably mounted on said chassis, a reversible gas operated motor for independently driving each wheel, control means for said motors, a gas supply conduit from said supply valve to said control means, gas supply and exhaust conduits from said control means to each of said motors, whereby upon operation of said supply valve and said control means said motors may be supplied with gas from either or both of said chambers, a condenser, a gas exhaust conduit from said control means to said condenser, and means to return liquid from said condenser through said return header to either or both of said chambers.

6. In an automotive vehicle, a chassis comprising spaced side members and a plurality of cross members connecting said side members, said members including at least two elongated tubular sections closed at their opposite ends to provide a pair of gas pressure generator chambers, a liquid in each chamber, means to vaporize said liquid, a gas supply manifold connecting said chambers, a gas supply valve in said manifold, a liquid return header connecting said chambers, a return valve in said header, ground engaging wheels rotatably mounted on said chassis, a reversible gas operated motor for independently driving each wheel, control means for said motors, a gas supply conduit from said supply valve to said control means, gas supply and exhaust conduits from said control means to each of said motors, whereby upon operation of said supply valve and said control means said motors may be supplied with gas from either or both of said chambers, a condenser, a gas exhaust conduit from said control means to said condenser and means to return liquid from said condenser through said header to either or both of said chambers.

7. In an automotive vehicle, a chassis comprising spaced side members and a plurality of cross members connecting said side members, at least one of said members including an elongated tubular section closed at its opposite ends to provide a gas pressure generator chamber, a liquid in said chamber, means to vaporize said liquid, ground engaging wheels rotatably mounted on said chassis, a reversible gas operated motor for independently driving each wheel, control means for said motors, a gas supply conduit from said chamber to said control means, gas supply and exhaust conduits from said control means to each of said motors, a condenser, a gas exhaust conduit from said control means to said condenser, and means to return liquid from said condenser to said chamber.

8. In a vehicle, a frame, said frame including at least two elongated tubular sections closed at their opposite ends to provide a pair of gas pressure generator chambers, a fluorocarbon liquid in each chamber, an electrical heating element in each chamber, a source of electrical energy for energizing said heating elements to vaporize said liquid, a gas supply manifold connecting said chambers, a three-way gas supply valve in said manifold, a liquid return header connecting said chambers, a three-way return valve in said header, a reversible gas operated motor for driving said vehicle, a combined forward, reverse and throttle control valve, a gas supply conduit from said supply valve to said control valve, gas supply and exhaust conduits from said control valve to said motor, whereby upon operation of said supply valve and said control valve said motor may be supplied with gas from either or both of said chambers, a condenser, a gas exhaust conduit from said control valve to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser to either or both of said chambers.

9. In a vehicle, a frame, said frame including at least two elongated tubular sections closed at their opposite ends to provide a pair of gas pressure generator chambers, a liquid in each chamber, an electrical heating element in each chamber, a source of electrical energy for energizing said heating elements to vaporize said liquid, a gas supply manifold connecting said chambers, a three-way gas supply valve in said manifold, a liquid return header connecting said chambers, a three-way return valve in said header, a reversible gas operated motor for driving said vehicle, a combined forward, reverse and throttle control valve, a gas supply conduit from said supply valve to said control valve, gas supply and exhaust conduits from said control valve to said motor, whereby upon operation of said supply valve and said control valve said motor may be supplied with gas from either or both of said chambers, a condenser, a gas exhaust conduit from said control valve to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser to either or both of said chambers.

10. In a vehicle, a frame, said frame including at least two elongated tubular sections closed at their opposite ends to provide a pair of gas pressure generator chambers, a liquid in each chamber, means to vaporize said liquid, a gas supply manifold connecting said chambers, a three-way gas supply valve in said manifold, a liquid return header connecting said chambers, a three-way return valve in said header, a reversible gas operated motor for driving said vehicle, a combined forward, reverse and throttle control valve, a gas supply conduit from said supply valve to said control valve, gas supply and exhaust conduits from said control valve to said motor, whereby upon operation of said supply valve and said control valve said motor may be supplied with gas from either or both of said chambers, a condenser, a gas exhaust conduit from said control valve to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser to either or both of said chambers.

11. In a vehicle, a frame, said frame including at least two elongated tubular sections closed at their opposite ends to provide a pair of gas pressure generator chambers, a liquid in each chamber, means to vaporize said liquid, a gas supply manifold connecting said chambers, a gas supply valve in said manifold, a liquid return header connecting said chambers, a return valve in said header, a reversible gas operated motor for driving said vehicle, a combined forward, reverse and throttle control valve, a gas supply conduit from said supply valve to said control valve, gas supply and exhaust conduits from said control valve to said motor, whereby upon operation of said supply valve and said control valve said motor may be supplied with gas from either or both of said chambers, a condenser, a gas exhaust conduit from said control valve to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser to either or both of said chambers.

12. In a vehicle, a frame, said frame including at least two elongated tubular sections closed at their opposite ends to provide a pair of gas pressure generator chambers, a liquid in each chamber, means to vaporize said liquid, a gas supply manifold connecting said chambers, a gas supply valve in said manifold, a liquid return header connecting said chambers, a return valve in said header, a reversible gas operated motor for driving said vehicle, control means for said motor, a gas supply conduit from said supply valve to said control means, gas supply and exhaust conduits from said control means to said motor, whereby upon operation of said supply valve and said control means said motor may be supplied with gas from either or both of said chambers, a condenser, a gas exhaust conduit from said control means to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser to either or both of said chambers.

13. In a vehicle, a frame, said frame including at least two elongated tubular sections closed at their opposite ends to provide a pair of gas pressure generator chambers, a liquid in each chamber, means to vaporize said liquid, a gas supply manifold connecting said chambers, a gas supply valve in said manifold, a liquid return header connecting said chambers, a return valve in said header, a reversible gas operated motor for driving said vehicle, control means for said motor, a gas supply conduit from said supply valve to said control means, gas supply and exhaust conduits from said control means to said motor, whereby upon operation of said supply valve and said control means said motor may be supplied with gas from either or both of said chambers, a condenser, a gas exhaust conduit from said control means to said condenser and means to return liquid from said condenser through said header to either or both of said chambers.

14. In a power plant at least two elongated tubular members closed at their opposite ends to provide a pair of gas pressure generator chambers, a fluorocarbon liquid in each chamber, an electrical heating element in each chamber, a source of electrical energy for energizing said heating elements to vaporize said liquid, a gas supply manifold connecting said chambers, a three-way gas supply valve in said manifold, a liquid return header connecting said chambers, a three-way return valve in said header, a gas operated motor providing a prime mover, a throttle control valve, a gas supply conduit from said supply valve to said control valve, a gas supply conduit from said control valve to said motor, whereby upon operation of said supply valve and said control valve said motor may be supplied with gas from either or both of said chambers, a condenser, a gas exhaust conduit from said motor to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser from either or both of said chambers.

15. In a power plant at least two elongated tubular members closed at their opposite ends to provide a pair of gas pressure generator chambers, a liquid in each chamber, an electrical heating element in each chamber, a source of electrical energy for energizing said heating elements to vaporize said liquid, a gas supply manifold connecting said chambers, a three-way gas supply valve in said manifold, a liquid return header connecting said chambers, a three-way return valve in said header, a gas operated motor providing a prime mover, a throttle control valve, a gas supply conduit from said supply valve to said control valve, a gas supply conduit from said control valve to said motor, whereby upon operation of said supply valve and said control valve said motor may be supplied with gas from either or both of said chambers, a condenser, a gas exhaust conduit from said motor to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser from either or both of said chambers.

16. In a power plant at least two elongated tubular members closed at their opposite ends to provide a pair of gas pressure generator chambers, a liquid in each chamber, means to vaporize said liquid, a gas supply manifold connecting said chambers, a three-way gas supply valve in said manifold, a liquid return header connecting said chambers, a three-way return valve in said header, a gas operated motor providing a prime mover, a throttle control valve, a gas supply conduit from said supply valve to said control valve, a gas supply conduit from said control valve to said motor, whereby upon operation of said supply valve and said control valve said motor may be supplied with gas from either or both of said chambers, a condenser, a gas exhaust conduit from said motor to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser from either or both of said chambers.

17. In a power plant at least two elongated tubular members closed at their opposite ends to provide a pair of gas pressure generator chambers, a liquid in each chamber, means to vaporize said liquid, a gas supply manifold connecting said chambers, a gas supply valve in said manifold, a liquid return header connecting said chambers, a return valve in said header, a gas operated motor providing a prime mover, a throttle control valve, a gas supply conduit from said supply valve to said control valve, a gas supply conduit from said control valve to said motor, whereby upon operation of said supply valve and said control valve, said motor may be supplied with gas from either or both of said chambers, a condenser, a gas exhaust conduit from said motor to said condenser, a liquid return pump, a conduit connecting the inlet of said pump and said condenser, a conduit connecting the outlet of said pump and said return valve, a gas motor for driving said pump and means for supplying said pump drive motor with gas from said supply valve and for exhausting gas therefrom to said condenser, whereby upon selectively setting said return valve said pump will operate to return condensed liquid from said condenser to either or both of said chambers.

18. In a power plant at least two elongated tubular members closed at their opposite ends to provide a pair of gas pressure generator chambers, a liquid in each chamber, means to vaporize said liquid, a gas supply manifold connecting said chambers, a gas supply valve in said manifold, a liquid return header connecting said chambers, a return valve in said header, a gas operated motor providing a prime mover, a throttle control valve, a gas supply conduit from said supply valve to said control valve, a gas supply conduit from said control valve to said motor, whereby upon operation of said supply valve and said control valve said motor may be supplied with gas from either or both of said chambers, a condenser, a gas exhaust conduit from said motor to said condenser and means to return liquid from said condenser through said header to either or both of said chambers.

References Cited in the file of this patent

UNITED STATES PATENTS

| Number | Name | Date |
|---|---|---|
| 423,421 | Farrall | Mar. 18, 1890 |
| 696,121 | Waldron | Mar. 25, 1902 |
| 1,442,401 | Grigas | Jan. 16, 1923 |
| 1,551,594 | Walter | Sept. 1, 1925 |
| 1,751,734 | Harris | Mar. 25, 1930 |
| 1,920,907 | La Mont | Aug. 1, 1933 |
| 1,963,091 | Jenkins | June 19, 1934 |
| 2,060,612 | Dake | Nov. 10, 1936 |
| 2,115,072 | Hunt et al. | Apr. 26, 1938 |
| 2,226,605 | Geyer et al. | Dec. 31, 1940 |
| 2,254,552 | Tjaarda | Sept. 2, 1941 |
| 2,328,499 | Saathoff | Aug. 31, 1943 |
| 2,507,357 | Stoner | May 9, 1950 |
| 2,584,078 | Hsi-yu | Jan. 29, 1952 |
| 2,596,968 | Harris et al. | May 20, 1952 |
| 2,646,250 | Fuster | July 21, 1953 |
| 2,728,583 | Tucker | Dec. 27, 1955 |
| 2,743,956 | Birkenstein | May 1, 1956 |
| 2,759,550 | Moorehead | Aug. 21, 1956 |
| 2,774,436 | Ferris | Dec. 18, 1956 |